June 20, 1933.　　　R. F. KRAUSE　　　1,915,129
HANDLE FOR COFFEEPOTS AND THE LIKE
Filed March 21, 1932

Inventor
R. F. Krause
By Frease and Bishop
Attorneys

Patented June 20, 1933

1,915,129

UNITED STATES PATENT OFFICE

RICHARD F. KRAUSE, OF MASSILLON, OHIO

HANDLE FOR COFFEEPOTS AND THE LIKE

Application filed March 21, 1932. Serial No. 600,142.

The invention relates to handles for cooking utensils and more particularly to a handle especially adapted for use upon coffeepots and the like.

The object of the improvement is to provide a handle preferably formed of one piece and especially adapted for coffeepots and the like, having a single point of connection to the utensil.

A further object of the improvement is to provide a handle comprising a substantially wide flat base portion attached to the coffeepot or other utensil and a hand grip portion located substantially at right angles to the base portion and connected thereto at a point spaced from one end.

Figure 1:
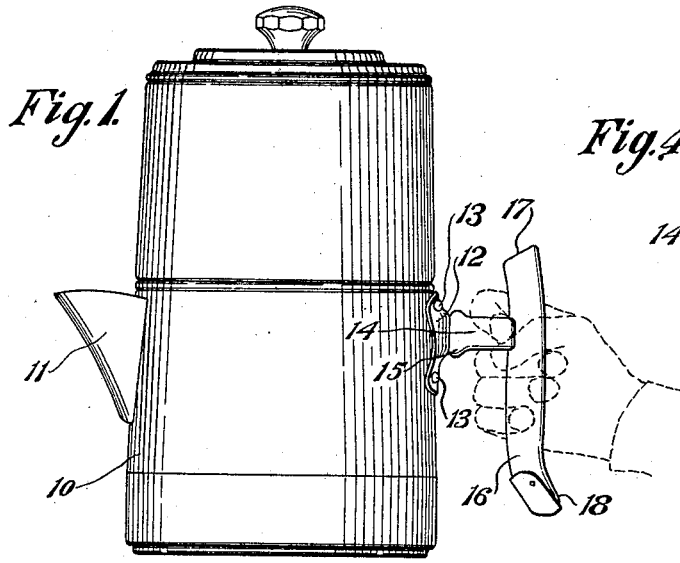
Figure 2:
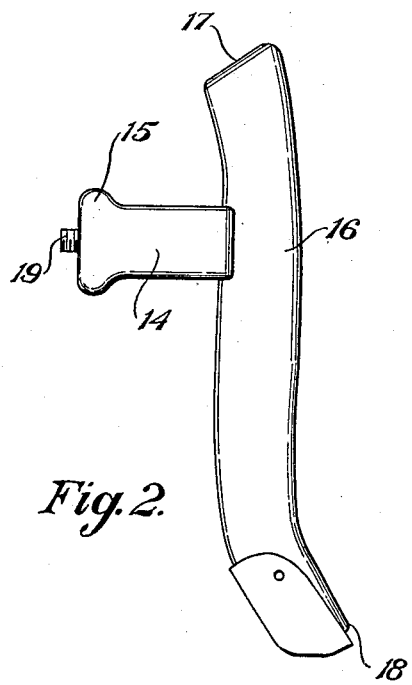
Figure 3:
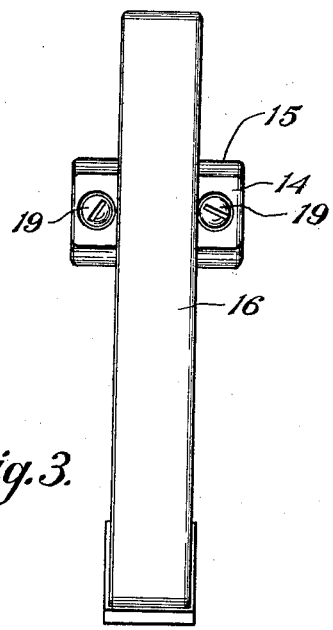

The above and other objects may be attained by constructing the improved handle in the manner illustrated in the accompanying drawing, in which Figure 1 is a side elevation of a coffeepot provided with the improved handle;

Fig. 2, an enlarged side elevation of the handle;

Fig. 3, a front elevation of the handle; and

Figure 4:
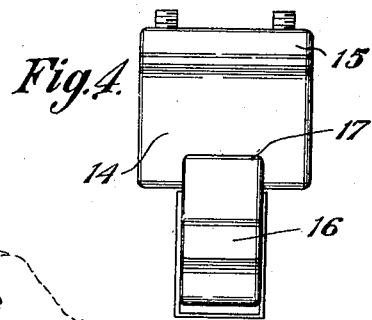

Fig. 4, a top plan view of the same.

Similar numerals refer to similar parts throughout the drawing.

For the purpose of illustration, the improved handle is shown attached to a coffeepot of the drip coffee type although it should be understood that this same form of handle is adapted for use upon other forms of coffeepots, percolators, teapots and other utensils.

A coffeepot is shown generally at 10, being provided on one side with the usual spout 11, the improved handle to which the invention pertains being preferably connected to the coffeepot at a point diametrically opposite to the spout. For this purpose a bracket 12 may be fixed to the coffeepot, as by rivets or the like indicated at 13, at a point diametrically opposite to the spout 11, for connection of the handle thereto.

The improved handle includes a substantially wide flat base portion 14 which may have its inner end slightly enlarged or thickened as at 15. A hand grip portion 16 is connected intermediate its ends to the base portion 14 at substantially right angles to said base portion.

The hand grip 16 is preferably connected to the base portion 14 at a point above the center of the hand grip and the upper shorter end thereof is preferably curved slightly inward or toward the pot as at 17, while the lower or longer end of the hand grip is preferably curved outward or away from the pot at its lower end as at 18.

The base and hand grip of the handle are preferably formed in one piece, the handle being desirably molded of some material such as bakelite or the like.

As illustrated in the drawing, the hand grip portion is considerably narrower than the base portion 14 and is centrally located thereon as best shown in Figs. 3 and 4, leaving room upon each side of the hand grip for screws 19 to be located through the base portion and attached to the bracket 12 in usual and well known manner.

The coffeepot or other utensil provided with the improved handle may be easily manipulated by grasping the handle in the manner indicated in Fig. 1 in which a hand is show in broken lines, the fingers being gripped around the hand grip 16, the base portion 14 being preferably received between the index and middle fingers of the hand as indicated in said figure.

The substantially wide flat base 14 is thus gripped between these two fingers, steadying the coffeepot against accidental turning movement in the hand, at the same time permitting the pot to be turned to any desired position by movement of the hand.

I claim:

1. A handle for coffeepots and the like including a substantially horizontal wide, flat base portion, and a substantially vertical, relatively narrow hand grip portion attached intermediate its ends to the base portion.

2. A handle for coffeepots and the like including a substantially horizontal wide, flat base portion, and a substantially vertical, relatively narrow hand grip portion attached intermediate its ends to the base portion, the upper end of the hand grip being curved toward the coffeepot and the lower end thereof being curved away from the coffeepot.

In testimony that I claim the above, I have hereunto subscribed my name.

RICHARD F. KRAUSE.